UNITED STATES PATENT OFFICE.

ROBERT R. GRAF, OF HIGHLANDTOWN, MARYLAND, ASSIGNOR OF ONE-HALF TO FRANK E. WELSH, JR., OF BALTIMORE, MARYLAND.

ALLOY.

1,101,534. Specification of Letters Patent. Patented June 30, 1914.

No Drawing. Application filed November 5, 1913. Serial No. 799,290.

*To all whom it may concern:*

Be it known that I, ROBERT R. GRAF, a citizen of the United States, residing at Highlandtown, in the county of Baltimore and State of Maryland, have invented certain new and useful Improvements in Alloys, of which the following is a specification.

My invention relates to an improvement in alloys, and has for its object to provide a composition of metal which may be employed as a substitute for platinum in various instances, such as electrical contacts, and the like, and which will be cheaper to manufacture, and can consequently be sold at considerably less price than the cost of platinum.

The composition consists of the following ingredients, to wit: platinum, four and one half ounces; silver, two and one half ounces; gold, one and one half ounces; sulfid of antimony, sixteen ounces; sodium chlorid, four ounces; crystallized vitriol, one and one half ounces; copper (pulverized) one and one half ounces, sulfur distillate, one and one half ounces; mercury, one and one half ounces.

In carrying out my invention, the vitriol, sulfid of antimony and sodium chlorid are placed in a retort and thoroughly baked, and then mixed with the platinum, silver, gold and copper, and melted together, to which is added the sulfur distillate and mercury. These ingredients when allowed to cool form my alloy. The antimony and mercury being more or less volatile at the temperature at which the other metals are molten, but slight traces of these ingredients remain in the alloy as a finished product. By this composition, I produce a metal which can be used in connection with electrical appliances and the like, as well as for other purposes to which platinum is adapted. This metal can be made much cheaper than platinum and can be employed as a substitute for platinum in the manufacture of various devices and appliances wherein platinum is usually employed.

The crystallized vitriol is prepared as follows: Powdered white vitriol (zinc sulfate) dissolved in alcohol is placed in a retort and subjected to heat of not less than 212 degrees Fahrenheit, from whence it is distilled to a receptacle and allowed to remain until crystallized, the time required to crystallize being approximately twenty days.

The sulfur distillate is prepared by placing a quantity of powdered sulfur in a retort and subject the same to a heat sufficient to cause a vapor to arise therefrom, this vapor is distilled into another receptacle and permitted to remain for a period of approximately twenty days, the distillate becoming more or less of an oily nature and is sometimes termed sulfur oil.

I am aware that changes may be resorted to in the method of mixing the ingredients and the proportions or quantities used without departing from the spirit and scope of my invention, and hence I do not wish to limit myself to the exact proportions and method of mixing as herein set forth, but;

Having fully described my invention, what I claim as new and desire to secure by Letters Patent, is;

An alloy consisting of platinum, forty five per cent., gold, fifteen per cent., silver, twenty five per cent., and copper, fifteen per cent.

In testimony whereof I affix my signature in presence of two witnesses.

ROBERT R. GRAF.

Witnesses:
 E. WALTON BREWINGTON,
 HOWARD D. ADAMS.